United States Patent [19]

Kromer

[11] Patent Number: 5,625,806

[45] Date of Patent: Apr. 29, 1997

[54] SELF CONFIGURING SPEED PATH IN A MICROPROCESSOR WITH MULTIPLE CLOCK OPTION

[75] Inventor: Stephen C. Kromer, Austin, Tex.

[73] Assignee: Advanced Micro Devices, Inc., Sunnyvale, Calif.

[21] Appl. No.: 693,505

[22] Filed: Aug. 8, 1996

Related U.S. Application Data

[63] Continuation of Ser. No. 355,302, Dec. 12, 1994, abandoned.

[51] Int. Cl.$^6$ ................................................ G06F 7/52
[52] U.S. Cl. ........................ 395/556; 364/703; 364/700; 364/270; 364/270.3
[58] Field of Search .................... 395/550; 307/259, 307/465; 364/200, 608

[56] References Cited

U.S. PATENT DOCUMENTS

| | | | |
|---|---|---|---|
| 4,482,983 | 11/1984 | Slechta, Jr. ........................ | 364/900 |
| 4,691,124 | 9/1987 | Ledzius et al. ...................... | 307/303 |
| 4,901,267 | 2/1990 | Biman et al. ........................ | 364/736 |
| 4,914,322 | 4/1990 | Win et al. ........................... | 307/465 |
| 5,059,318 | 10/1991 | Witt et al. .......................... | 307/269 |
| 5,291,070 | 3/1994 | Witt ................................... | 307/269 |
| 5,349,544 | 9/1994 | Wright et al. ....................... | 354/600 |
| 5,422,835 | 6/1995 | Houle et al. ......................... | 364/703 |

FOREIGN PATENT DOCUMENTS

0607667A1   7/1994   WIPO .

OTHER PUBLICATIONS

Peng, "Design of Clocking Schemes in High-Level Synthesis," *Microprocessing and Microprogramming*, Apr. 31, 1991, pp. 71–74.

*Primary Examiner*—Kevin A. Kriess
*Assistant Examiner*—Majid Banankhah
*Attorney, Agent, or Firm*—Foley & Lardner

[57] ABSTRACT

A microprocessor having an option to select one of multiple clock frequencies as an internal clock frequency. The microprocessor reconfigures the speed paths of internal function circuit on the basis of a clock selection signal used to select the internal clock frequency. In this manner the minimum number of internal clock cycles are used to carry out the function of the function circuit despite the particular internal frequency selected.

8 Claims, 5 Drawing Sheets

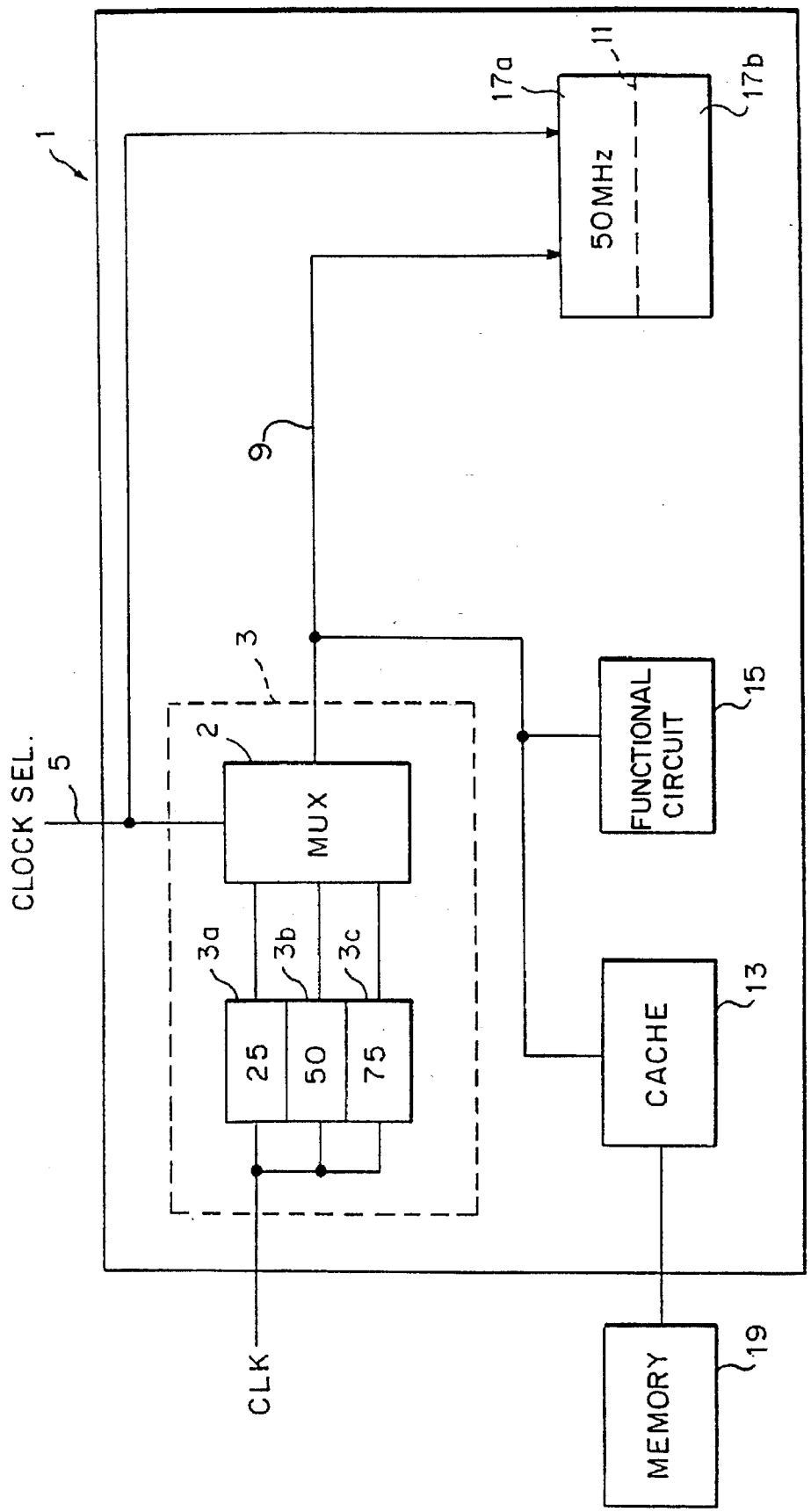

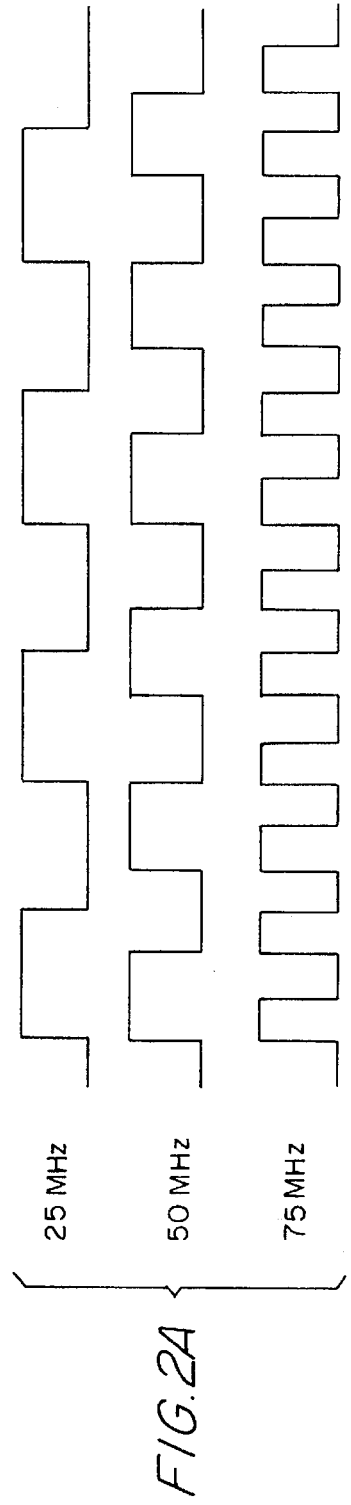
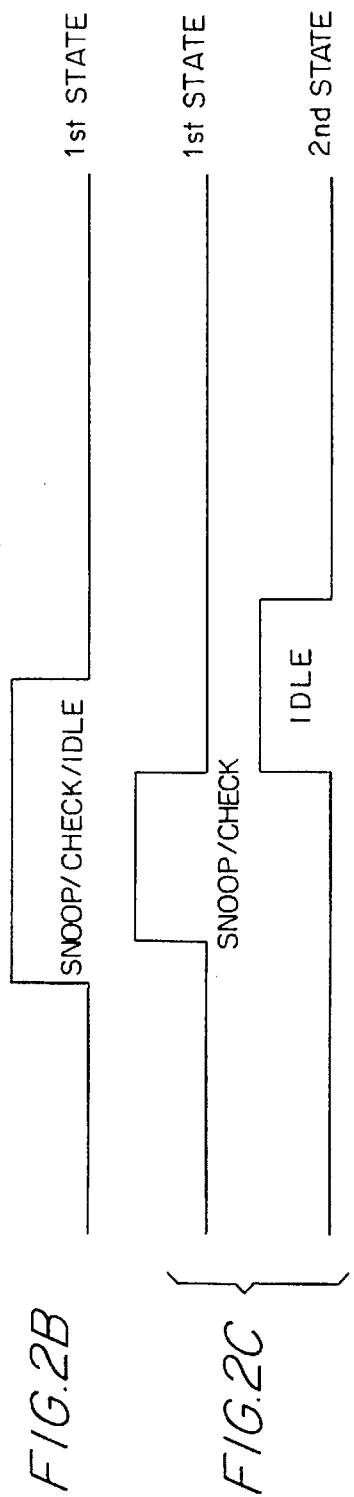
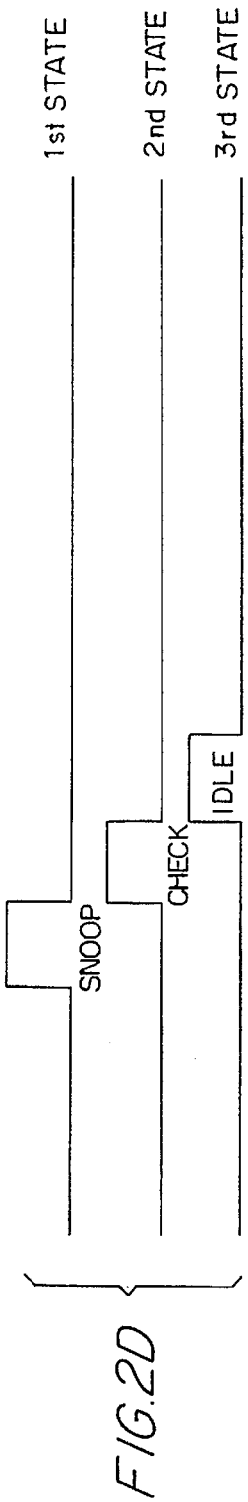
FIG.2A
FIG.2B
FIG.2C
FIG.2D

SELF CONFIGURING SPEED PATH IN A MICROPROCESSOR WITH MULTIPLE CLOCK OPTION

This application is a continuation, of application Ser. No. 08/355,302, filed Dec. 12, 1994 now abandoned.

BACKGROUND OF THE INVENTION

The invention relates to a self configuring speed path for use in a microprocessor having a multiple clock frequency option. More specifically, the instant invention relates to a reconfigurable speed path which is responsive to a clock select signal in a multiple clock microprocessor to configure the speed path for use with a clock signal having a higher frequency than the speed path's normal operational capability.

In microprocessors having multiple clock options, an external clock at a first frequency, for example, 25 MHz, is applied within the microprocessor to a circuit which outputs several clock frequencies at multiples of the external clock. Thus, a clock applied to such a microprocessor has a circuit which outputs an internal clock at one of a plurality of multiples of the externally applied clock frequency. For example, a 25 MHz clock might allow the user to select an internal clock at 25 MHz, 50 MHz, or 75 MHz. The internal clock is used by individual functional circuits of the microprocessor. It generally is desirable to select the clock multiple which leads to the best overall system performance.

One problem associated with such conventional devices arises when the clock frequency is selected at one of the higher multiples, since a particular functional circuit may require more than one clock cycle to perform its function. This results in a speed path. As used herein a speed path is a path that takes longer to resolve than the other paths in the processor. Such speed paths impose a maximum limit on the processor's internal clock frequency. In order to overcome this problem considerable effort has been under taken to design faster speed paths, because the timing of the worst speed path ultimately limits the microprocessor's top operating frequency.

SUMMARY OF THE INVENTION

Accordingly, it is an object of the instant invention to overcome the above drawbacks associated with conventional multiple clock microprocessors by using a self configuring speed path.

Another object of the invention is to reconfigure the speed path using the clock configuration in the microprocessor with multiple clock options to avoid the speed path limit on the operating frequency experienced in conventional microprocessors having multiple clock options.

To achieve these and other objectives, there is provided a microprocessor having: a clock input for receiving an external clock; a multiple clock circuit providing an internal clock at selected multiples of the frequency the external clock in response to a clock selection signal; and an internal circuit performing a function in a time period longer than the time period corresponding to any of the possible internal clock multiples. The internal circuit is responsive to the clock selection signal to operate through a number of states corresponding to the selected multiple.

In accordance with another embodiment of the invention there is provided a microprocessor which includes an internal clock generating circuit connected to receive an external clock and an clock selection signal to produce an internal clock at one of plurality of clock frequencies according to the clock selection signal and an internal circuit configured as a state machine performing a function in a first number of latch stages according to a first value of said clock selection signal and a second number of latch stages according to a second value of said clock selection signal.

In accordance with another embodiment, there is provided a microprocessor including: a clock input; a multiple clock circuit having an output providing an internal clock at selected multiples of a frequency applied to the clock input in response to a clock selection signal; an internal circuit performing a function and outputting a result in a first time period which is longer than a second time period corresponding to the internal clock when one of the selected multiples is selected; and a counter circuit connected to the clock selection signal and the internal circuit configured to count up a predetermined number of clock cycles, the counter circuit outputting a signal indicating that the result from the internal circuit is valid when the predetermined number of clock cycles has been counted.

BRIEF DESCRIPTION OF THE DRAWINGS

The features of the instant invention will be understood from the detailed description of the preferred embodiments set forth below and accompanying drawings in which:

FIG. 1 illustrates a microprocessor in accordance with an embodiment of the instant invention;

FIGS. 2A–2D illustrate the operation of a second embodiment of the instant invention;

DETAILED DESCRIPTION OF THE PREFERRED EMBODIMENTS

Figure 3A:
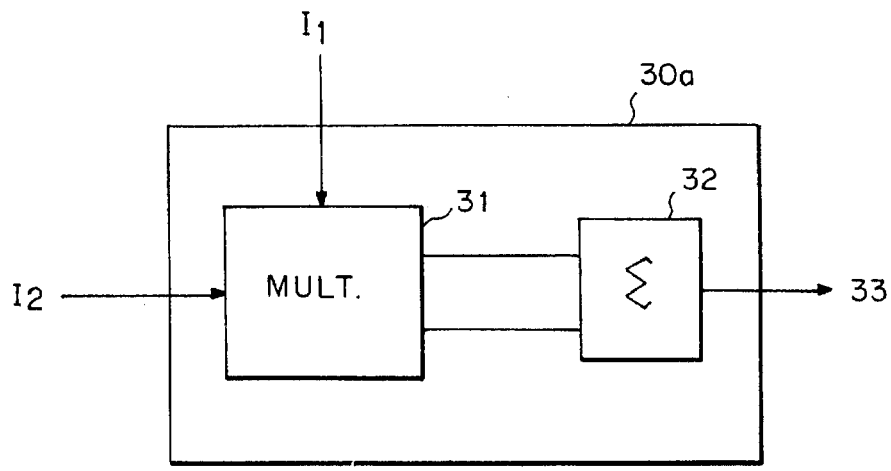
FIGS. 3A–3B illustrate a multiplying circuit according to an embodiment of the instant invention.

FIG. 1 depicts microprocessor having a multiple clock frequency option according to one embodiment of the instant invention. In FIG. 1, an external clock CLK is applied to microprocessor 1. A multiple frequency internal clock generating circuit 3 is provided within microprocessor 1 which provides outputs at multiples of the frequency of external clock CLK. In the example illustrated in FIG. 1, the external clock CLK is provided at a clock frequency of 25 MHz. The internal clock frequency generating circuit receives the external clock CLK along with a clock select signal along signal line 5. The internal clock frequency will be selected according to the desired use of microprocessor 1. Thus, in accordance with the ultimate use of the microprocessor having a multiple clock option, one of the portions 3a, 3b, or 3c, of the internal clock generating circuit 3 is selected. The internal clock generating circuit 3 outputs 25 MHz, 50 MHz, or 75 MHz, respectively. This selection would be accomplished by multiplexer 2 which receives the clock select signal along clock select line 5.

The internal processor clock is the output of the multiplexer on signal line 9. The internal clock at signal line 9 is then applied to individual functional circuits 11, 13, and 15. As noted, although the external clock frequency may be 25 MHz, this internal clock frequency on signal line 9 could be either 25 MHz, 50 MHz or 75 MHz. It should be noted that, although FIG. 1 shows multiples of a clock frequency up to three, any number of clock frequency multiples can be used.

As described above, it is desirable to select the highest possible frequency that can be accommodated by the functional circuits 11, 13 and 15 in order to improve microprocessor performance. However, in this case one or more of the functional circuits 11, 13, 15 may require more than one clock cycle to perform its function when the clock frequency is at one of the higher multiples.

In order to accommodate the higher internal clock speeds, in a first embodiment of the instant invention the speed path circuit can be configured into a state machine where the number of clock multiples is the number of states. For example, assume that circuit 11 performs a function that can be accomplished in one clock cycle at a rate of 50 MHz. Thus, if the internal clock on signal line 9 output by multiplexer 2 is selected as either 25 MHz 3a or 50 MHz 3b, circuit 11 will operate properly. This can be accomplished by using the circuitry 17a which operates at 50 MHz and completes the functionality within one clock cycle.

On the other hand, if the user transmits a signal on clock select line 5 to select 75 MHz 3c as the internal clock on signal line 9, the 50 MHz circuitry in block 17a will not complete its processing in one clock cycle. Therefore, it will be necessary for two cycles to be employed. This can be accomplished by using circuitry 17b which performs the same function in two clock cycles at 75 MHz. The determination of whether to use circuitry 17a or 17b is determined on the basis of the clock select signal supplied on signal line 5. In this manner, the remaining circuitry in the microprocessor continues to operate at the higher frequency (e.g., 75 MHz), while the circuitry in function block 11 is reconfigured to take two clock pulses and effectively operates at 37.5 MHz.

FIGS. 2A–2D illustrate a second embodiment according to the instant invention in the circumstance of a multiple state machine in conjunction with FIG. 1. In the second embodiment, function circuitry 13 is a cache which performs snoop functions on a memory 19. Snoop functions are used when cache memory 13 checks back to memory 19 to determine if the information in the cache is up to date. The details of the snooping function are not part of this invention, and are generally well known. Accordingly, further details of snooping are not provided herein.

FIG. 2A illustrates multiple frequency clocks (i.e., 25 MHz, 50 MHz, and 75 MHz) for purposes of illustrating the various state machine configurations. FIG. 2B illustrates a condition at 25 MHz where there is sufficient time for cache 13 to snoop memory 19, compare or check the information against the contents in the cache 13, and have additional idle time. Thus, the cache 13 is a single state machine at 25 MHz or one times the external clock.

FIG. 2C illustrates a second condition which may exist, for example, at 50 MHz. In this case, during a first clock cycle, snooping and checking operations are completed and the snoop activities are idle during the second clock cycle. In this case, the cache machine has been configured to a two state machine corresponding to two times the frequency of the external clock.

FIG. 2D illustrates a third condition which would exist, for example, at 75 MHz. In this case, one clock cycle is required to complete the snoop, a second clock cycle completes the check, and the state machine is idle during the third clock cycle. Thus, at three times the external clock, the state machine has three states. It should be noted that during idle periods, other activities can be performed. Thus, during the idle periods in FIGS. 2C and 2D, the state machine could be used for some other task. Moreover, if snooping and checking could be performed in one clock period in FIG. 2D, then two idle states would be available for other uses.

Figure 3B:
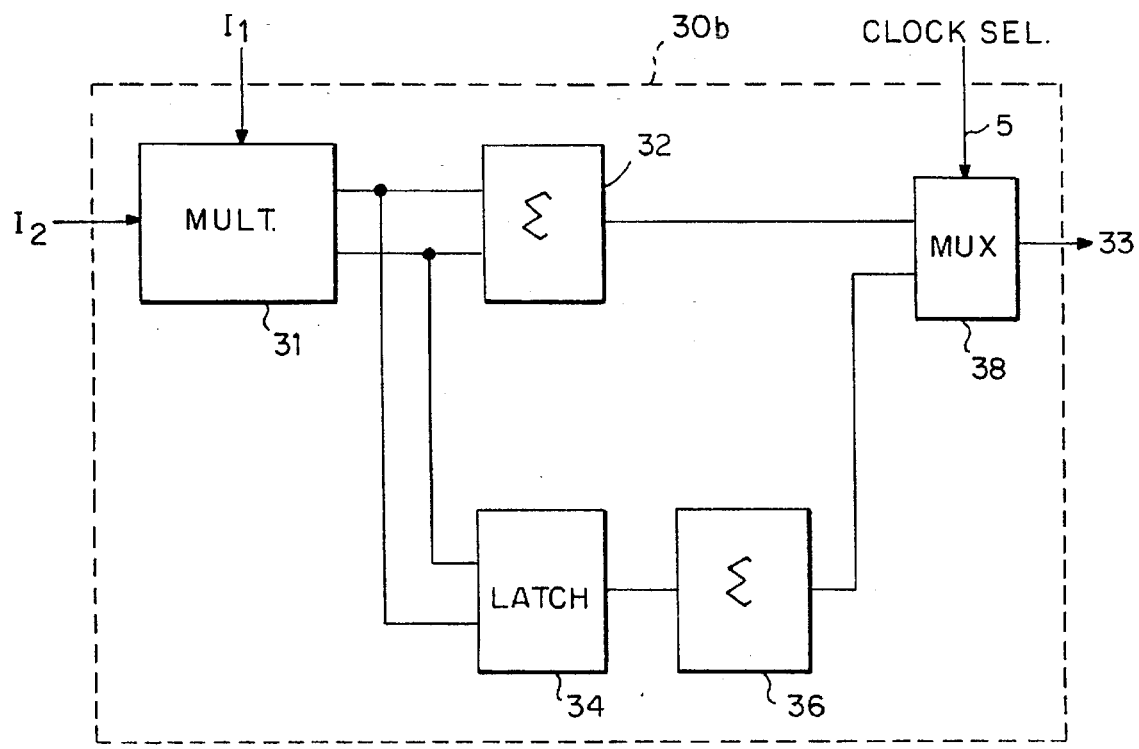

FIGS. 3A and 3B illustrate a third embodiment of the instant invention. FIG. 3A illustrates a conventional multiplying circuit 30a having inputs $I_1$ and $I_2$. Multiplying circuit 30a includes a multiplier 31 receiving $I_1$ and $I_2$ and an adder 32 receiving the output from the multiplier 31. The function of multiplier 31 and adder 32 combine to produce the output 33 of the multiplying circuit 30. At 25 MHz, it may be possible to complete the entire multiplication and addition in one clock cycle resulting in a single state machine. However, at 50 MHz, it may not be possible to complete both the multiplication in multiplier 31 and the addition in adder 32 in a single cycle. Thus, the conventional circuit may become a speed path limiting the internal operating frequency to 25 MHz.

FIG. 3B illustrates a multiplying circuit 30b in accordance with an embodiment of the instant invention. While the conventional circuit 30a will not be able to complete operation at 50 MHz, it may be possible to carry out the multiplication in a first cycle and the addition in a second cycle. As shown in FIG. 3B, the output from the multiplier 31 is applied to a latch 34 during the first clock period. Adders 32 and 36 are then used and, depending on the status of the clock selection signal 5, multiplexer 38 selects either the output from adder 32 (at the 25 MHz condition) or the output of adder 36 (at the 50 MHz condition). In this manner, the multiplying circuit 30b properly configures itself in response to the clock select signal 5 to carry out the multiplication in either one clock cycle or two clock cycles dependent upon the frequency of the internal clock.

Figure 4:
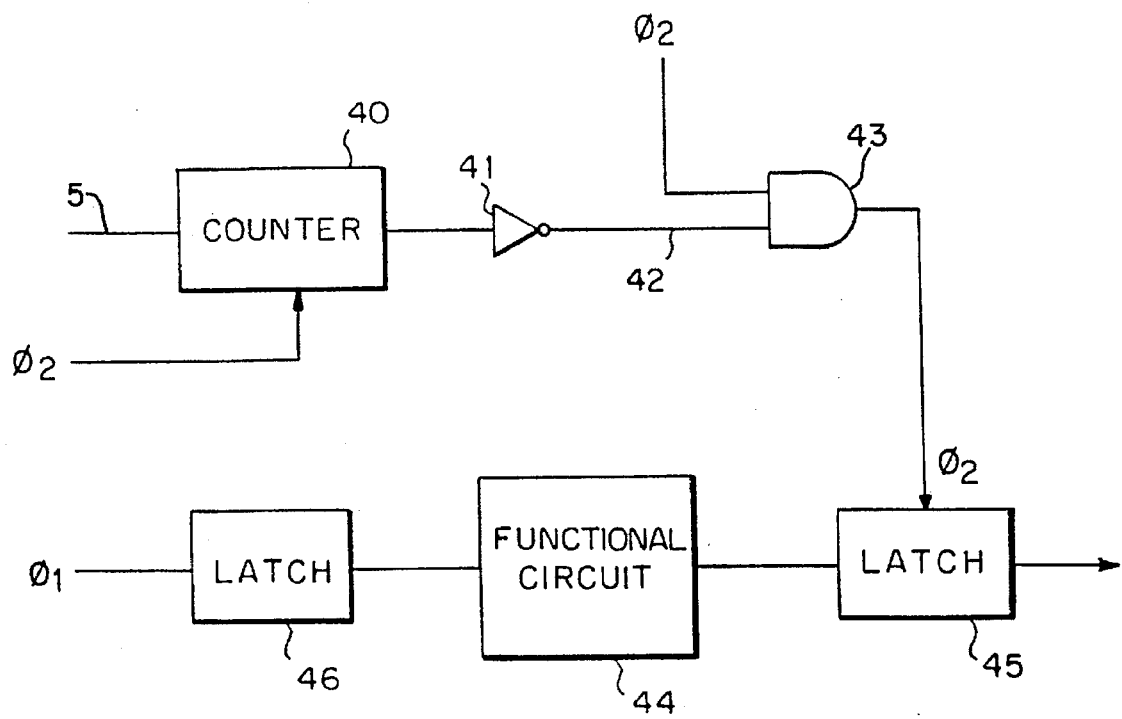
FIG. 4 illustrates another embodiment of the instant invention.

FIG. 4 illustrates still another embodiment of the instant invention which employs an execution hold. In the embodiment of FIG. 4, the dual circuits 17a and 17b of FIG. 1 are replaced with a single circuit which configures itself for the proper frequency. In FIG. 4, the circuit receives an input which is latched into latch 46 with a first phase $\phi_1$ of the internal clock and an output latch 45 which is triggered on a second phase $\phi_2$ of a subsequent clock.

In the embodiment depicted in FIG. 4, when a speed path is being used, the clock configuration is loaded into a counter 40 which counts the number of internal clock cycles needed for the speed path to resolve. This is in response to clock select signal 5. Until counter 40 counts the appropriate number of clocks to resolve the speed path, the condition of signal line 42 is such that the output of AND gate 43 remains low. When the counter 40 determines that the necessary number of clock periods have expired, the signal present on line 42 goes high and the phase $\phi_2$ clock is allowed to reach latch 45. The number of clock periods required is determined by the functionality performed by functional circuit 44, which receives its input from latch 46. As a result, the output from functional circuit 44 is not latched until "n" cycles are completed, and the execution of the function has been achieved.

Figure 5:
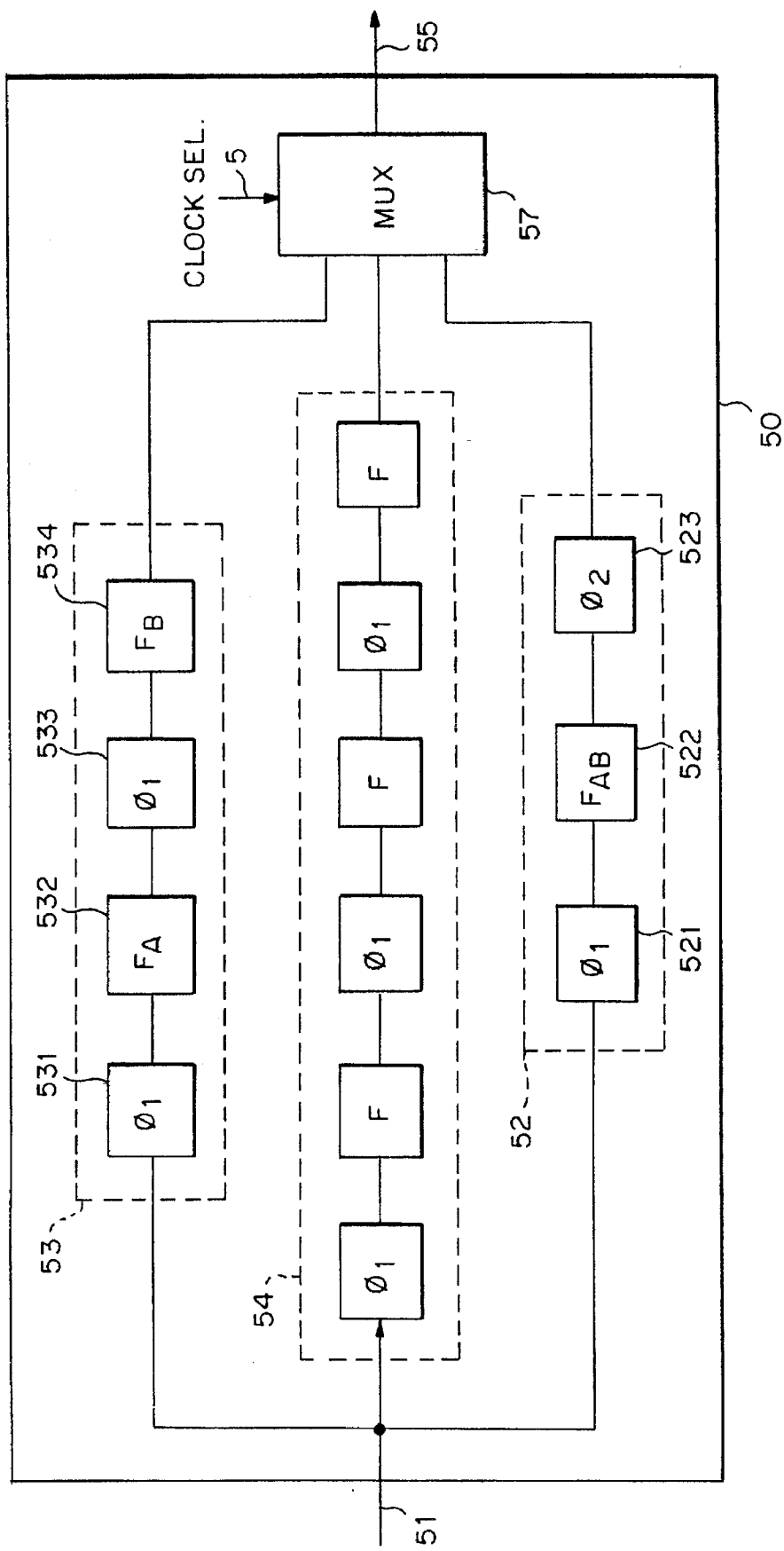
FIG. 5 illustrates still another embodiment of the instant invention.

FIG. 5 illustrates yet another embodiment of the instant invention. FIG. 5 is a more general application of the embodiment depicted in FIG. 3B. In this embodiment multiple circuits are designed so that different circuits are provided for the different internal clock frequencies. In FIG. 5, an input 51 is provided to an overall functional circuit 50. The functional circuit 50 is comprised of three separate operational paths 52, 53 and 54, each of which is designed to carry out the same functional operation. Each of the circuits 52, 53 and 54 are associated with a particular internal frequency and are designed to carry out the function using as few clock cycles as necessary to make the speed path. For example, the circuits 52, 53 and 54 may be designed to operate at the selected multiples of 25 MHz, 50 MHz and 75 MHz, respectively. The outputs of the circuits 52, 53 and 54 are provided to a multiplexer 57. The multiplexer 57 selects one of the outputs on the basis of the clock select signal 5. In this manner, the output is selected for the particular circuit which carries out the desired function in the fewest number of clock cycles for the selected internal frequency.

The embodiment of FIG. 5 is particularly adapted to a pipeline environment since multiple instructions may be operated on at different functional portions of the operational path. For example, operational path 52 may include latches 521 and 523 operating pursuant to clocks $\Phi_1$ and $\Phi_2$ respectively. Functional circuit 522 carries out the function $F_{AB}$. Since this path is used with the internal frequency of 25 MHz, there is sufficient time to carry out the entire function $F_{AB}$. Alternatively, operational path 53 includes latches 531 and 533 and functional circuit $F_A$ and $F_B$. Since operational path 53 operates at 50 MHz, it cannot complete the entire function $F_{AB}$ in one cycle. Accordingly, the functions are divided into two steps $F_A$ and $F_B$ which combine to the overall function $F_{AB}$. In this manner, at the first clock cycle of $\Phi_1$, $F_A$ will be processed, and at the second clock cycle of $\Phi_1$, $F_B$ will be processed. When the circuit is operating in a pipeline, function $F_A$ can be carried out on a subsequent instruction while the function $F_B$ is being carried out on the current instruction. In other words, parts of the overall function $F_{AB}$ can be carried out on multiple instructions at the same time. Thus, while the embodiment of FIG. 5 uses more space than that of FIG. 4, it can improve performance since more than one instruction can be simultaneously operated on by the operational paths.

While the above embodiments illustrate the features of the instant invention, the instant invention is not limited to the specific embodiment disclosed. Numerous variations on the inventive features of the instant invention will become apparent to those skilled in the art upon review of the instant disclosure. Accordingly, the instant invention is only limited by the appended claims.

What is claimed is:

1. A microprocessor, comprising:

a clock input configured to receive a clock signal having a clock frequency associated therewith;

a multiple clock circuit connected to said clock input and having an output providing an internal clock at selected multiples of said clock frequency applied to said clock input in response to a clock selection signal, each of said selected multiples of said clock frequency having an associated internal clock period defined as an inverse of said corresponding selected multiple of said clock frequency; and an internal circuit configured to receive said internal clock signal from said multiple clock circuit and said clock selection signal, said internal circuit configured to perform a function in a time period longer than said associated internal clock period corresponding to one of said selected multiples of said clock frequency of said internal clock when at least one of said selected multiples is selected, said internal circuit being responsive to said clock selection signal to operate through a number of states corresponding to said one of said selected multiples.

2. A microprocessor, comprising:

an internal clock generating circuit connected to receive an external clock and an clock selection signal, said internal clock generating circuit configured to produce an internal clock at one of a plurality of clock frequencies according to the clock selection signal; and an internal circuit configured as a state machine to perform a function in a first number of states according to a first value of said clock selection signal and a second number of states according to a second value of said clock selection signal.

3. A microprocessor comprising:

a clock input configured to receive a clock signal having a clock frequency;

a multiple clock circuit connected to said clock input and having an output providing an internal clock at selected multiples of said clock frequency applied to said clock input in response to a clock selection signal;

an internal circuit connected to said multiple clock circuit and configured to perform a function and to output a result in a first time period which is longer than a second time period corresponding to an inverse of said clock frequency of said internal clock when one of said selected multiples is selected; and a counter circuit connected to said clock selection signal and said internal circuit and configured to count up a predetermined number of clock cycles, said counter circuit outputting a signal indicating that the output from the internal circuit is valid when said predetermined number of clock cycles has been counted.

4. A microprocessor operating internally at an internal clock frequency selected from a plurality of clock frequencies according to a clock selection signal, comprising:

a plurality of circuits internal to the microprocessor each designed to perform an identical function, each of the plurality of circuits corresponding to one of the plurality of clock frequencies for performing the identical function in a minimum number of clocks of the corresponding clock frequency; and a selector connected to receive the output from each of the plurality of circuits and to select an output from one of said plurality of circuits which corresponds to the internal clock frequency.

5. A microprocessor according to claim 3, wherein said predetermined number of clock cycles corresponds in time to n times said first time period, n being an integer, and wherein (n−1) times said second time period is less than said first time period, and n times said second time period is equal to or greater than said first time period.

6. A microprocessor according to claim 1, wherein said multiple clock circuit comprises:

a first portion configured to receive said clock signal and to output said clock signal;

a second portion configured to receive said clock signal and to multiply said clock signal by a first integer value and to output a first multiplied clock signal having an associated first multiplied clock frequency as a result thereof;

a third portion configured to receive said clock signal and to multiply said clock signal by a second integer value different from said first integer value and to output a second multiplied clock signal having an associated second multiplied clock frequency as a result thereof; and a multiplexer configured to receive said clock selection signal on a control input and configured to receive said clock signal from said first portion on a first input port, said first multiplied clock signal on a second input port, and said second multiplied clock signal on a third input port, said multiplexer outputting one of said clock signal, first multiplied clock signal and second multiplied clock signal according to a state of said clock selection signal.

7. A microprocessor according to claim 6, wherein said internal circuit has a first portion configured to perform said function in a first plurality of clock periods at said clock frequency, a second portion configured to perform said function in a second plurality of clock periods at said first multiplied clock frequency, and a third portion configured to perform said function in a third plurality of clock periods at said second multiplied clock frequency, wherein one of said first portion, second portion and third portion of said internal circuit is chosen to perform said function based on said state of said clock selection signal, and wherein first plurality is less than said second plurality, and said second plurality is less than said third plurality.

8. A microprocessor according to claim 7, wherein said internal circuit is a cache memory, and wherein said function performed by said cache memory includes a snoop function, a check function, and an idle function, and wherein said cache memory is operable in one of a first state, a second state and a third state, such that in said first state, said cache memory performs said snoop function, said check function and said idle function all within a first clock period defined as an inverse of said clock frequency, and that in said second state, said cache memory performs said snoop function and check function but not said idle function all within a second clock period defined as an inverse of said first multiplied clock frequency, and performs said idle function in a succeeding second clock period, and that in said third state, said cache memory performs only said snoop function in a third clock period defined as an inverse of said second multiplied clock frequency, and performs said check function in a succeeding third clock period, and performs said idle function in a next succeeding third clock period, and wherein said state of said clock selection signal determines which of said first, second and third states of said cache memory is to be chosen.

* * * * *